US012555841B2

(12) United States Patent
Park

(10) Patent No.: US 12,555,841 B2
(45) Date of Patent: Feb. 17, 2026

(54) SYSTEM AND METHOD FOR COOLING BATTERY MODULES INCLUDED IN ENERGY STORAGE SYSTEM (ESS)

(71) Applicant: LG ENERGY SOLUTION, LTD., Seoul (KR)

(72) Inventor: Jun Cheol Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1072 days.

(21) Appl. No.: 17/627,466

(22) PCT Filed: Sep. 24, 2020

(86) PCT No.: PCT/KR2020/013015
§ 371 (c)(1),
(2) Date: Jan. 14, 2022

(87) PCT Pub. No.: WO2021/085866
PCT Pub. Date: May 6, 2021

(65) Prior Publication Data
US 2022/0263150 A1     Aug. 18, 2022

(30) Foreign Application Priority Data

Oct. 28, 2019   (KR) ......................... 10-2019-0134646

(51) Int. Cl.
*H01M 10/63* (2014.01)
*H01M 10/42* (2006.01)
*H01M 10/48* (2006.01)

(52) U.S. Cl.
CPC ......... *H01M 10/63* (2015.04); *H01M 10/482* (2013.01); *H01M 2010/4271* (2013.01)

(58) Field of Classification Search
CPC .. H01M 10/63; H01M 10/613; H01M 10/486; H01M 10/6563; H01M 10/482
See application file for complete search history.

(56) References Cited

U.S. PATENT DOCUMENTS

2005/0269994 A1   12/2005   Ishishita
2009/0024252 A1    1/2009   Aridome et al.
2012/0156530 A1    6/2012   Kang et al.
(Continued)

FOREIGN PATENT DOCUMENTS

JP   H09-092347 A     4/1997
JP   2005-347085 A   12/2005
(Continued)

OTHER PUBLICATIONS

Extended European Search Report dated Sep. 23, 2022, issued by the European Patent Office in corresponding European Patent Application No. 20882673.5.
(Continued)

*Primary Examiner* — Sarah A. Slifka
(74) *Attorney, Agent, or Firm* — Morgan, Lewis & Bockius LLP

(57) ABSTRACT

The present invention relates to a battery module cooling system and method thereof and more specifically, relates to a battery module cooling system and method thereof in which it is possible to individually control the corresponding cooling fan by considering the temperature and voltage states of each battery module included in the energy storage system (ESS) and it does not require the operation of connecting a separate external power cable for each cooling fan to drive the cooling fan.

11 Claims, 2 Drawing Sheets

(56) References Cited

U.S. PATENT DOCUMENTS

| | | |
|---|---|---|
| 2014/0038007 A1 | 2/2014 | Ahn |
| 2014/0356657 A1 | 12/2014 | Yamamoto et al. |
| 2017/0365893 A1 | 12/2017 | Kim et al. |
| 2018/0083460 A1 | 3/2018 | Min |

FOREIGN PATENT DOCUMENTS

| | | |
|---|---|---|
| JP | 2007-200780 A | 8/2007 |
| JP | 2012-244865 A | 12/2012 |
| JP | 2014-232600 A | 12/2014 |
| KR | 10-2004-0045937 A | 6/2004 |
| KR | 10-2013-0051102 A | 5/2013 |
| KR | 10-1297005 B | 8/2013 |
| KR | 10-2014-0019096 A | 2/2014 |
| KR | 10-1409999 B | 6/2014 |
| KR | 10-2015-0067842 A | 6/2015 |
| KR | 10-1538232 B | 7/2015 |
| KR | 10-1543071 B1 | 8/2015 |
| KR | 10-2016-0007739 A | 1/2016 |
| KR | 10-1660883 B | 9/2016 |
| KR | 10-2017-0018715 A | 2/2017 |
| KR | 10-2017-0142053 A | 12/2017 |
| KR | 10-1924527 B1 | 12/2018 |
| WO | 2014/128753 A1 | 8/2014 |

OTHER PUBLICATIONS

International Search Report and Written Opinion issued in corresponding International Patent Application No. PCTKR2020013015, dated Sep. 28, 2020.
Notice of Allowance dated Mar. 6, 2023, issued in corresponding Japanese Patent Application No. 2022-503883.

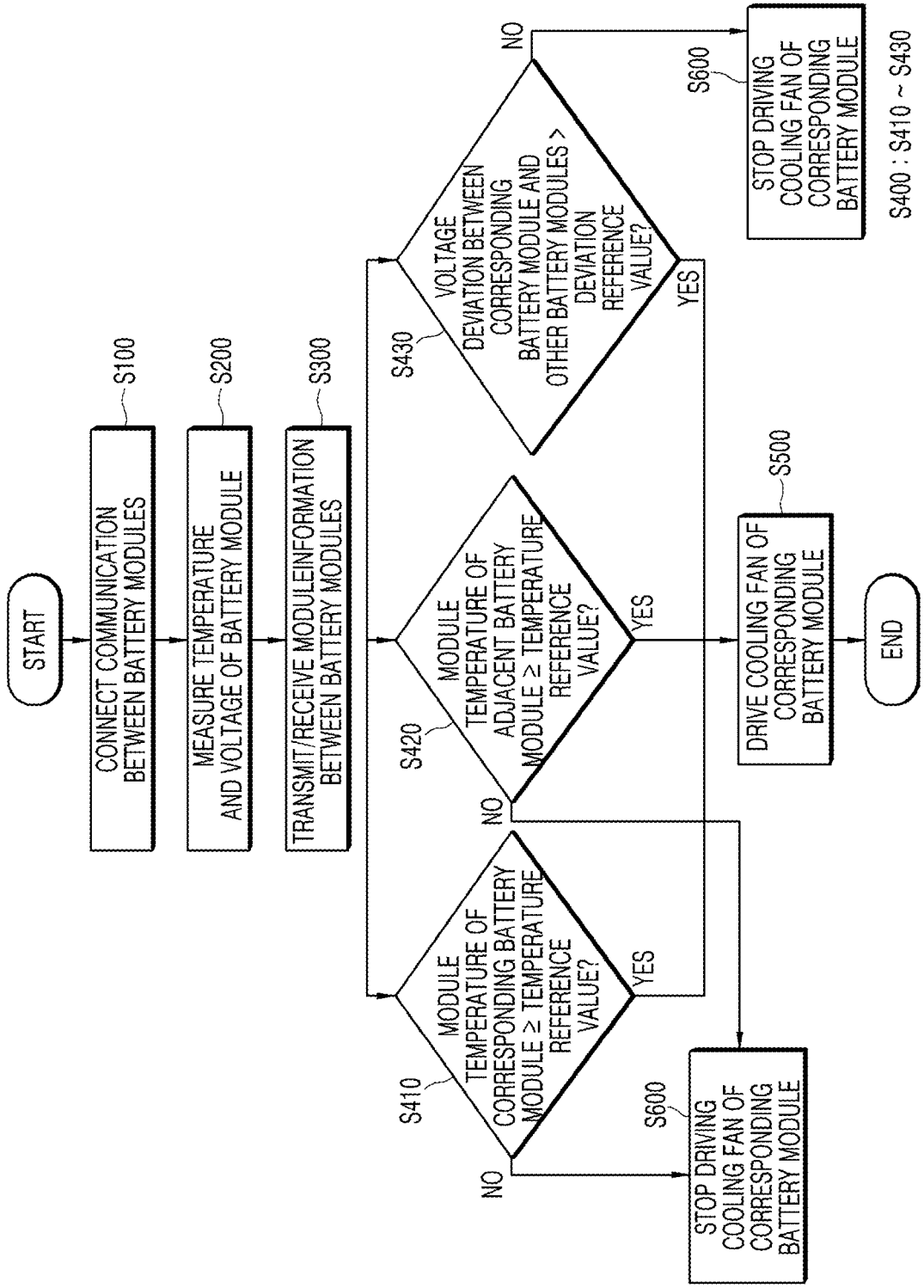

SYSTEM AND METHOD FOR COOLING BATTERY MODULES INCLUDED IN ENERGY STORAGE SYSTEM (ESS)

TECHNICAL FIELD

The present invention relates to a cooling system and method for a battery module, and more particularly, to a cooling system and method for a battery module by controlling a cooling fan of a battery module constituting an energy storage system (ESS).

BACKGROUND ART

In general, a plurality of battery cells are connected in series/parallel to form a battery module, and a number of battery modules are loaded and electrically connected to each other through a bus bar to form a single battery rack, and a number of such battery racks are gathered and installed in the same place as a container to establish an energy storage system (ESS).

Since the battery cells generate heat through charging/discharging, each battery module constituting the energy storage system (ESS) is provided with a cooling fan for cooling the battery cells whose temperature is increased.

The cooling fans provided in each battery module are connected to a separate external power cable connected to one external power supply source, and through this, the cells are cooled in a manner driven by power from an external power source.

However, since all the cooling fans are driven at the same time without considering the temperature conditions of each battery module, in this way, the driving method by an external power supply source has a problem in that it is difficult to stably manage the heat generation state of all battery modules, and a lot of electrical energy is inefficiently consumed.

In addition, when configuring a battery rack, there is also the hassle of connecting a separate external power cable for each cooling fan of the loaded battery modules.

(Patent Document 1) KR10-2013-0051102 A

DISCLOSURE

Technical Problem

The present invention is to solve the above-described problem, and more specifically, relates to a battery module cooling system and method thereof in which it is possible to individually control the corresponding cooling fan by considering the temperature and voltage states of each battery module included in the energy storage system (ESS) and it does not require the operation of connecting a separate external power cable for each cooling fan to drive the cooling fan.

Technical Solution

According to the present invention, a cooling system of a battery module in an energy storage system (ESS) includes at least one battery rack with at least two battery modules, wherein each battery module includes: a plurality of battery cells connected in series/parallel; a cooling fan configured to operate by using voltages of the battery cells as driving power; and a battery management system (BMS) configured to control whether the cooling fan is turned on or off according to a temperature and voltage state of the battery module.

Specifically, the battery management system (BMS) includes: a temperature measurement unit configured to measure a temperature of the battery module at predetermined periodic intervals; a voltage measurement unit configured to measure a voltage of the battery module at predetermined periodic intervals; a communication unit configured to connect communication with other battery modules; a DC/DC converter configured to receive a voltage from the battery cells, convert the received voltage into a voltage that drives the cooling fan, and output the converted voltage; and a cooling fan control unit configured to determine whether the cooling fan is turned on or off according to a state of the module temperature and the module voltage measured by the temperature measurement unit and the voltage measurement unit, respectively.

The cooling fan control unit includes: a module information transmission unit configured to transmit the module temperature and the module voltage of the corresponding battery module measured by the temperature measurement unit and the voltage measurement unit to other battery modules communicatively connected through the communication unit; a module information reception unit configured to receive module information from other battery modules communicatively connected through the communication unit; a first determination unit configured to compare the module temperature measured by the temperature measurement unit with a predetermined temperature reference value, and determine whether the cooling fan of the corresponding battery module is turned on or off according to the comparison result; a second determination unit configured to compare the temperature of the adjacent module of the adjacent battery module adjacent to the corresponding battery module with a predetermined temperature reference value based on the module information of other battery modules received by the module information reception unit, determine whether the cooling fan of the corresponding battery module is turned on or off according to the comparison result; and a third determination unit configured to compare whether the module voltage of the corresponding battery module is higher than that of other battery modules based on the module voltage measured by the voltage measurement unit and module information of other battery modules received by the module information reception unit and determines whether the cooling fan of the corresponding battery module is turned on or off according to the comparison result.

Here, the first determination unit outputs a fan operation signal for operating the cooling fan of the corresponding battery module when the module temperature of the corresponding battery module is equal to or higher than a predetermined temperature reference value, and outputs a fan stop signal so that the cooling fan of the battery module does not operate when the module temperature is less than a predetermined temperature reference value.

Moreover, the second determination unit outputs a fan operation signal for operating the cooling fan of the corresponding battery module when the module temperature of the adjacent battery module is higher than or equal to a predetermined temperature reference value, and outputs a fan stop signal so that the cooling fan of the corresponding battery module does not operate when the module temperature of the adjacent battery module is less than a predetermined temperature reference value.

Furthermore, the third determination unit includes: a module voltage deviation calculation unit configured to calculate a difference between a module voltage measured by the voltage measurement unit and a module voltage included in module information of other battery modules received by the module information reception unit; and a module voltage deviation comparison unit configured to compare whether a value exceeding a predetermined deviation reference value exists among the calculated module voltage deviations.

Here, the module voltage deviation comparison unit outputs a fan operation signal for operating a cooling fan for discharging the corresponding battery module if there is a module voltage deviation that exceeds the predetermined deviation reference value according to a result of the comparison.

Moreover, the DC/DC converter outputs the voltage to the cooling fan by increasing a voltage level to drive the cooling fan when the fan operation signal is outputted, and lowers the voltage level so that the cooling fan is not driven and outputs the voltage to the cooling fan when the fan stop signal is outputted.

According to the present invention, a cooling control method of a battery module includes: a communication connection step of connecting communication between a plurality of battery modules included in the battery rack; a module state data measurement step of measuring module temperature and module voltage of the battery module at predetermined periodic intervals; a module information transmission/reception step of transmitting module information including the measured module temperature and module voltage of the corresponding battery module to the communication-connected other battery module and receiving the module information from the communication-connected other battery module; a cooling fan operation status determination step of determining a cooling fan operation status of the corresponding battery module based on the module temperature and module voltage of the corresponding battery module measured in the module state data measurement step, and module information of other battery modules received in the module information transmission/reception step; and a cooling fan driving power application step of adjusting a level of voltage applied from the battery cells to output the adjusted voltage to the cooling fan according to a determination result of the cooling fan operation status determination step.

Specifically, the cooling fan operation status determination step includes: a first cooling operation determination step of comparing the module temperature of the corresponding battery module measured in the module state data measurement step with a predetermined temperature reference value, and determining whether a cooling fan of the corresponding battery module is operated according to the comparison result; a second cooling operation determination step of comparing the module temperature of an adjacent battery module adjacent to the corresponding battery module among the module temperatures of other battery modules received in the module information transmission/reception step with a predetermined temperature reference value, and determining whether the cooling fan of the corresponding battery module is operated according to the comparison result; and a third cooling operation determination step of comparing whether the module voltage of the corresponding battery module measured in the module state data measurement step is higher than the module voltage of other battery modules received in the module information transmission/reception step, and determining whether the cooling fan of the corresponding battery module is operated according to the comparison result.

Here, the first cooling operation determination step outputs a fan operation signal for operating the cooling fan of the corresponding battery module when the module temperature of the corresponding battery module is equal to or higher than a predetermined temperature reference value, and outputs a fan stop signal so that the cooling fan of the corresponding battery module does not operate when the module temperature is less than a predetermined temperature reference value.

Moreover, the second cooling operation determination step outputs a fan operation signal for operating the cooling fan of the corresponding battery module when the module temperature of the adjacent battery module is higher than or equal to a predetermined temperature reference value, and outputs a fan stop signal so that the cooling fan of the corresponding battery module does not operate when the module temperature of the adjacent battery module is less than a predetermined temperature reference value.

Furthermore, the third cooling operation determination step includes: a module voltage deviation calculation step of calculating a difference between a module temperature of the corresponding battery module measured in the module state data measurement step and a module voltage of other battery modules received in the module information transmission/reception step; and a module voltage deviation comparison step of comparing whether a value exceeding a predetermined deviation reference value exists among the calculated module voltage deviations.

The method further includes outputting a fan operation signal to operate the cooling fan in order to discharge the corresponding battery module if there is a module voltage deviation that exceeds the predetermined deviation reference value according to a result of the comparison in the module voltage deviation comparison step.

Accordingly, the cooling fan driving power application step outputs the voltage to the cooling fan by increasing a voltage level to drive the cooling fan when the fan operation signal is outputted, and lowers the voltage level so that the cooling fan is not driven and outputs the voltage to the cooling fan when the fan stop signal is outputted.

Advantageous Effects

In the present invention, since the cooling fan can be individually controlled according to the temperature state of each battery module, it is possible to manage the heat of battery modules more stably and efficiently, and furthermore, it is possible to efficiently manage the energy of the entire energy storage system (ESS).

In addition, when the battery rack is installed, the hassle of connecting a separate external power cable for each cooling fan of each battery module is eliminated, and productivity compared to the existing process can be improved.

DESCRIPTION OF DRAWINGS

FIG. 2 is a flowchart illustrating a method for controlling the cooling of a battery module according to the present invention.

BEST MODE

Figure 1:
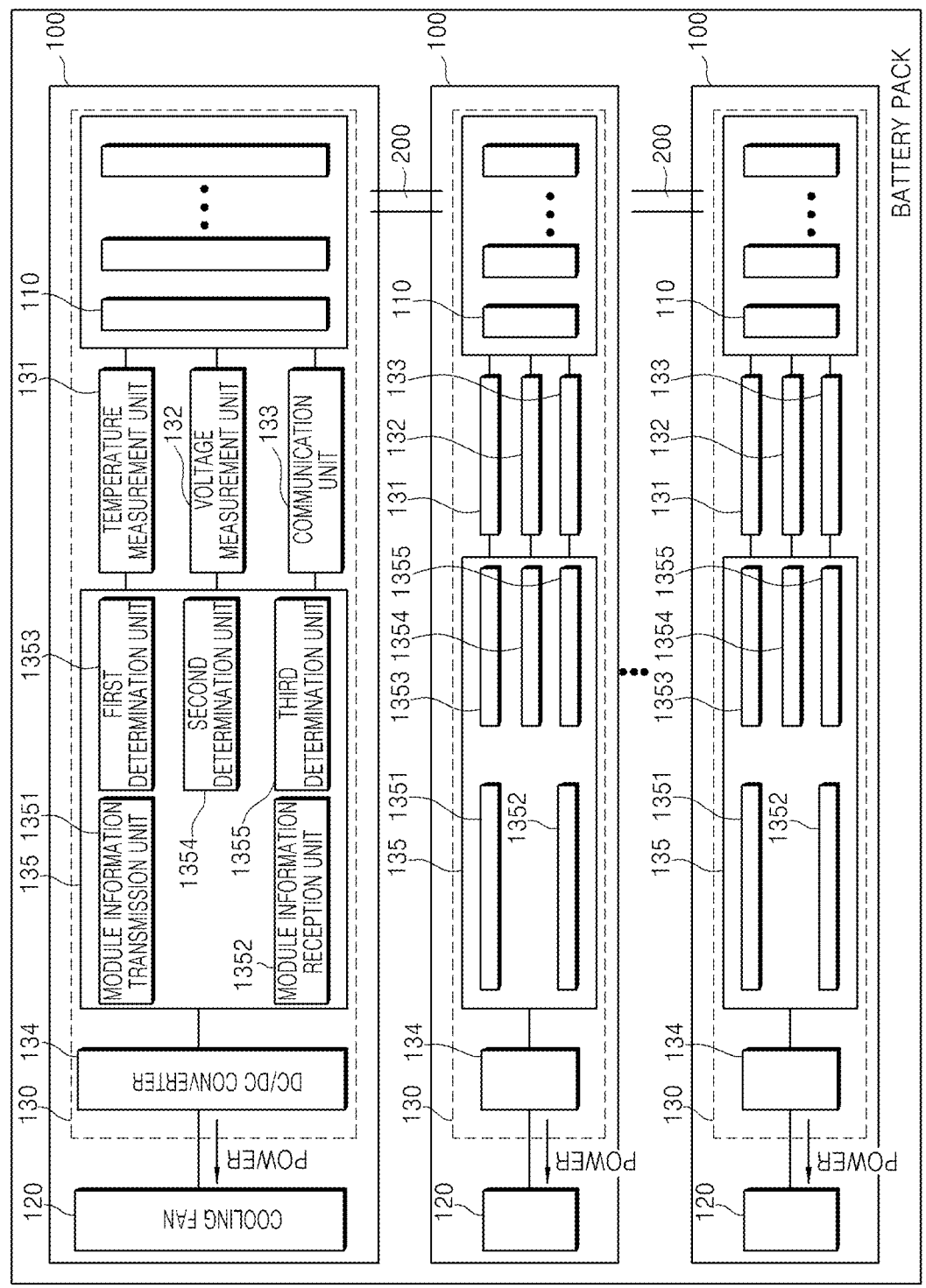
FIG. 1 is a diagram schematically showing the overall configuration of a cooling system of a battery module according to the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Cooling System of Battery Module According to Present Invention

Generally, in the energy storage system (ESS), a number of battery cells are connected in series/parallel form to form a battery module, and a number of battery modules are interconnected through bus bars to form one battery rack, and such a battery rack is made in the form of a large number.

In the energy storage system (ESS) made in this form, the present invention relates to a cooling system of a plurality of battery modules constituting one battery rack, and it is configured to include the following configuration.

Referring to FIG. 1, each configuration will be described.

1.1. Battery Module 100

Each battery module 100 constituting one battery rack may include a plurality of battery cells 110, a cooling fan 120, and a battery management system (BMS) 130.

A. Battery Cell 110

The battery module 100 may include a plurality of battery cells 110 connected in series/parallel form. As mentioned above, the battery cells 110 constitute one battery module 100, and a plurality of these battery modules 100 are gathered and connected to each other through the bus bar 200 to form one battery rack.

B. Cooling Fan 120

The cooling fan 120 may perform a cooling operation for the corresponding battery module 120 by receiving the voltage of the battery module 120 as driving power and driving it.

Specifically, the cooling fan 120 is driven by the voltage of the battery cells 110 applied through the DC/DC converter 134 provided in the battery management system (BMS) 130 to be described later according to the temperature and voltage states of the battery module 100 to perform a cooling operation for cooling the corresponding battery cells 110.

C. Battery Management System (BMS) 130

The battery management system (BMS) 130 measures the temperature and voltage state of the battery module 100 and adjusts the magnitude of the voltage that the DC/DC converter 134 outputs to the cooling fan 120 accordingly, thereby controlling the operation of the cooling fan 120. Such a battery management system (BMS) 130 may be configured including the following detailed configuration.

1) Temperature Measurement Unit 131

The temperature measurement unit 131 is a configuration that measures the temperature of the battery module 100 at predetermined periodic intervals, and for example, may measure the temperature of the battery module 100 using a known technique such as a method using a temperature sensor (not shown). The temperature of the battery module 100 measured by the temperature measurement unit 131 is referred to as the module temperature and described.

2) Voltage Measurement Unit 132

The voltage measurement unit 132 is a component that measures the voltage of the corresponding battery module 100 at predetermined periodic intervals, and may measure the voltage of the battery module 100 using a known technique. The voltage of the corresponding battery module 100 measured by the voltage measurement unit 132 is referred to as a module voltage and described.

3) Communication Unit 133

The communication unit 133 is a component for connecting communication with other battery modules that are electrically interconnected through a bus bar 200. By the communication unit 133, a plurality of battery modules 100 constituting one battery rack are interconnected in communication, and the battery module 100 may transmit its own module information to the other battery module 100 and may receive the module information from the other battery module 100.

Here, the Module Information May be Configured to Include the module temperature and module voltage of the corresponding battery module 100 measured in the temperature measurement unit 131 and the voltage measurement unit 132 described above and the module identification number that can identify the battery module 100.

4) DC/DC Converter 134

The DC/DC converter 134 receives a voltage from the battery cells 110 included in the corresponding battery module 100, and converts the received voltage to a voltage suitable for the cooling fan 120, and outputs the voltage, and this may convert a voltage applied from the battery cells 110 to a voltage suitable for driving the cooling fan 120 under the control of the cooling fan control unit 135 to be described later, and output the voltage to the cooling fan 120. Accordingly, the operation of the cooling fan 120 may be controlled.

Specifically, when a fan operation signal is outputted from the cooling fan control unit 135 to be described later, the DC/DC converter 134 may control and output a voltage level so that the cooling fan 120 can be driven. Accordingly, the cooling fan 120 is operated by the power inputted from the DC/DC converter 134.

On the other hand, when a fan stop signal is outputted from the cooling fan control unit 135, the voltage level may be adjusted not to drive the cooling fan 120 and outputted. Accordingly, the cooling fan 120 does not operate.

That is, the DC/DC converter 134 adjusts the voltage level according to the control of the cooling fan control unit 135 and outputs the adjusted voltage level to the cooling fan 120 to control the on/off of the operation of the cooling fan 120.

5) Cooling Fan Control Unit 135

The cooling fan control unit 135 may be configured to control the operation of the cooling fan 120 according to the module temperature and module voltage of the corresponding battery module 100 measured in the temperature measurement unit 131 and the voltage measurement unit 132.

The cooling fan control unit 135 may be configured to include the following detailed configuration.

A. Module Information Transmission Unit 1351

The module information transmission unit 1351 may be configured to transmit its own module information including the module temperature and module voltage measured in the temperature measurement unit 131 and the voltage measurement unit 132, and a module identification number to the other battery module 100 communicatively connected through the communication unit 133.

B. Module Information Reception Unit 1352

The module information reception unit 1352 may be configured to receive the module information from the other battery modules 100 that are communicatively connected through the communication unit 133.

By the module information transmission unit 1351 and the module information reception unit 1352, module information may be exchanged between a plurality of battery modules 100 constituting one battery rack.

Here, since the module information includes a module identification number indicating the corresponding battery module 100, by using this, module information for each battery module can be classified.

C. First Determination Unit 1353

The first determination unit 1352 may compare the module temperature measured by the temperature measurement unit 131 with a predetermined temperature reference value, and determine whether the cooling fan 120 is operated based on the comparison result.

According to a result of the comparison, when the module temperature is greater than or equal to a predetermined temperature reference value, it is determined that the temperature of the corresponding battery module needs to be lowered, and a fan operation signal may be outputted so that the cooling fan 120 can operate. In this case, the DC/DC converter 134 increases the voltage outputted to the cooling fan 120 to operate the cooling fan 120, and the cooling fan 120 cools the battery cells 110 to lower the temperature state.

On the other hand, if the module temperature is less than a predetermined temperature reference value, the corresponding battery module may determine that cooling is not necessary and may output a fan stop signal so that the cooling fan 120 does not operate. Accordingly, the DC/DC converter 134 reduces the output voltage to the cooling fan 120 so that the cooling fan 120 does not operate, and thus the temperature of the battery cells 110 does not drop more than necessary.

In this way, by individually controlling the operation of the cooling fan 120 according to the module temperature of the battery module 100, a cooling operation suitable for temperature conditions of each battery module may be performed.

D. Second Determination Unit 1354

The second determination unit 1354 may compare the module temperature of the battery module at a location adjacent to itself in the module information with a predetermined temperature reference value based on the module information of other battery modules received by the module information reception unit 1352, and may determine whether the cooling fan 120 of the corresponding battery module is operated according to the comparison result.

At this time, for convenience of explanation, the battery module adjacent to itself is referred to as the adjacent battery module, and the module temperature is referred to as the adjacent module temperature, and it is possible to obtain a module temperature value for a battery module in a location adjacent to itself by using a corresponding module identification number included in the module information.

According to a result of the comparison, if the temperature of the adjacent module is greater than or equal to a predetermined temperature reference value, in order to minimize the effect of the corresponding battery module due to heat generation of adjacent battery modules, a fan operation signal may be outputted so that the cooling fan 120 of the battery module may operate. In this case, the DC/DC converter 134 may increase the output voltage to the cooling fan 120 so that the cooling fan 120 can operate. The reason is that for example, if the temperature state of the battery module adjacent to it is in a high state, the temperature of the battery module 100 may rise due to the heat generation, and thus, in order to prevent this situation in advance, if the adjacent module temperature is above the predetermined temperature reference value, by determining that the cooling fan 120 of the corresponding battery module should operate and outputting a fan operation signal, an increase in temperature of the corresponding battery module 100 due to heat generation of adjacent battery modules can be prevented in advance.

On the other hand, if the adjacent module temperature is less than a predetermined temperature reference value, it may be determined that the cooling fan 120 does not need to operate and may output a fan stop signal. Accordingly, the DC/DC converter 134 may lower the output voltage to the cooling fan 120 to prevent the cooling fan 120 from operating.

In this way, by determining and controlling whether the cooling fan 120 is operated according to the adjacent module temperature of the battery module adjacent to the corresponding battery module 100, the above-described situation that may occur due to heat generation of a battery module adjacent to the corresponding battery module can be prevented in advance.

E. Third Determination Unit 1355

The third determination unit 1355 may compare the module voltage of the corresponding battery module measured by the voltage measurement unit 132 with the module voltages of other battery modules received from the module information reception unit 1351, and may determine whether the cooling fan 120 is operated according to the comparison result. The third determination unit 1355 may include a module voltage deviation calculation unit (not shown) and a module voltage deviation comparison unit (not shown) as a detailed configuration thereof.

The module voltage deviation calculation unit (not shown) may calculate a deviation between the module voltage of the corresponding battery module measured by the temperature measurement unit 131 and the module voltage of other battery modules received by the module information reception unit 1351, respectively. A difference between a module voltage of a corresponding battery module and a module voltage of another battery module calculated by the module voltage deviation calculator (not shown) will be referred to as a module voltage deviation.

The module voltage deviation comparison unit 135b may compare each module voltage deviation, which is a difference in voltage between the corresponding battery module calculated by the module voltage deviation calculator (not shown) and other battery modules, with a predetermined deviation reference value, and may determine whether the cooling fan 120 of the corresponding battery module is operated according to the comparison result.

Specifically, when the calculated module voltage deviation exceeds a predetermined deviation reference value, it may be determined that the module voltage of the corresponding battery module is higher than the module voltage of other battery modules, and a fan operation signal may be outputted so that the cooling fan 120 of the corresponding battery module operates.

On the other hand, when the calculated module voltage deviation is less than or equal to a predetermined deviation reference value, a fan stop signal may be outputted to prevent the corresponding cooling fan 120 from operating.

To explain the principle, the cooling fan 120 according to the present invention is configured to use the voltage of the battery cells 110 included in the corresponding battery module as a driving power, which is not a separate external power source. Accordingly, if the voltage state of the corresponding battery module is higher than that of other battery modules, the cooling fan 120 is driven to discharge the battery cells 110 to achieve voltage balancing with other battery modules.

In this way, it is determined whether the voltage state of the corresponding battery module 100 is higher than that of other battery modules, and if it is high, by discharging the battery cells 110 through the driving of the cooling fan 120 of the corresponding battery module to maintain a balance of the voltage state with other battery modules, the battery modules included in the battery rack can maintain a uniform voltage state.

1.2. Bus Bar 200

The bus bar 200 is a configuration that interconnects a plurality of battery modules 100 constituting one battery rack, and a plurality of battery modules 100 may be electrically connected to each other through the bus bar 200.

In this way, by considering the temperature and voltage state of each battery module and individually controlling the operation of the cooling fan accordingly, thermal management of battery cells included in each battery module may be performed more effectively. In addition, since the cooling fan is driven by the voltage of each battery module itself, which is not a separate external power source, the work of connecting each conventional cooling fan with a separate external power cable becomes unnecessary, so that this can eliminate the hassle and improve the ease and convenience for assembling the module.

2. Cooling Control Method of Battery Module Included in Energy Storage System According to Present Invention (See FIG. 2)

The method of controlling the cooling operation of the battery module according to the present invention may include the following steps.

2.1. Communication Connection Step S100

The Communication Connection Step S100 is a Step of Connecting communication between a plurality of battery modules 100 constituting a battery rack, and this may be performed by the above-described communication unit 133 provided in the battery management system (BMS) 130 of each battery module 100.

2.2. Module State Data Measurement Step S200

The module state data measurement step is a step of measuring the temperature and voltage of the corresponding battery module 100 at predetermined periodic intervals, and here, the measured temperature and voltage values of the battery module 100 are referred to as module temperature and module voltage, respectively.

This may be performed by the temperature measurement unit 131 and the voltage measurement unit 132 described above.

2.3. Module Information Transmission/Reception Step S300

The module information transmission/reception step may be step of transmitting module information including module temperature and module voltage of itself (corresponding battery module) measured in the module state data measurement step S200 to another battery module connected to the communication, and receiving module information including the module temperature and module voltage from the other battery module connected to the communication.

Here, the module information includes a module temperature and a module voltage measured in the module state measurement step S200, and a module identification number identifying a corresponding battery module.

This may be performed by the module information transmission unit 1351 and the module information reception unit 1352 described above.

2.4. Cooling Fan Operation Status Determination Step S400

The cooling fan operation status determination step is a step of determining whether the cooling fan 120 of the corresponding battery module is operating based on the module temperature and module voltage of the corresponding battery module measured in the module state data measurement step S200 and the module temperature and module voltage of other battery modules received through the module information transmission/reception step S300, and this may be configured including the following detailed steps.

A. First Cooling Operation Determination Step S410

The first cooling operation determination step may compare the module temperature of the corresponding battery module measured in the module state data measurement step S200 with a predetermined temperature reference value, and may determine whether the cooling fan 120 of the corresponding battery module is operating according to the comparison result.

According to a result of the comparison, when the module temperature is greater than or equal to a predetermined temperature reference value, it is determined that the cooling fan 120 should operate, and a fan operation signal may be outputted. In this case, since the temperature of the corresponding battery module, that is, its own temperature, is in a high state, it is necessary to perform a cooling operation for the battery cells 110, so that the fan operation signal is outputted to operate the cooling fan 120.

On the other hand, if the module temperature is less than a predetermined temperature reference value, it is determined that the cooling fan 120 does not need to operate, and a fan stop signal may be outputted. In this case, since the temperature of the corresponding battery module, that is, its own temperature, is in a normal state, a cooling operation is not required for the battery cells 110, so that the fan stop signal is outputted not to operate the cooling fan 120.

This step may be performed by the first determination unit 1352 described above.

B. Second Cooling Operation Determination Step S420

The second cooling operation determination step is a step of determining whether the cooling fan 120 of the corresponding battery module is operated based on the module temperature of the other battery module received in the module information transmission/reception step S300.

Specifically, among the received module temperatures of other battery modules, the module temperature (adjacent module temperature) of an adjacent battery module adjacent to itself is compared with a predetermined temperature reference value, and according to the comparison result, it may be determined whether the cooling fan 120 of the corresponding battery module is operated.

According to a result of the comparison, if the temperature of the adjacent module is greater than or equal to a predetermined temperature reference value, it is determined that a cooling operation for the corresponding battery module is required, so that a fan operation signal may be outputted to allow the cooling fan 120 to operate. This is because that if the temperature state of the corresponding battery module, that is, the adjacent battery module adjacent to itself, is high, because of the effect of the heat generation, a situation in which the temperature rises to itself may occur, so that in order to prevent such a situation in advance, a fan operation signal is outputted to operate the cooling fan 120.

On the other hand, if the adjacent module temperature is less than a predetermined temperature reference value, it is determined that the cooling fan 120 of the battery module, that is, its own battery module, does not need to operate and a fan stop signal may be outputted so that the cooling fan 120 does not operate.

Such an operation may be performed by the second determination unit 1354 described above.

C. Third Cooling Operation Determination Step S430

The third cooling operation determination step may determine whether the cooling fan 120 of the corresponding battery module is operating according to the difference between the module voltage of the corresponding battery module measured in the module state data measurement step S200 and the module voltage of other battery modules received through the module information transmission/reception step S300.

1) Module Voltage Deviation Calculation Step (not Shown)

First, the module voltage deviation, which is the difference between the module voltage of the corresponding battery module measured in the module state data measurement step S200 and the module voltage of each other battery module received in the module information transmission/reception step S300, can be calculated. This may be performed by a module voltage deviation calculation unit (not shown) of the third determination unit 1355.

2) Module Voltage Deviation Comparison Step (not Shown)

The calculated each module voltage deviation may be compared with a predetermined deviation reference value.

According to a comparison result, when the module voltage deviation exceeds a predetermined deviation reference value, it may be determined that the module voltage of the corresponding battery module is higher than the module voltage of other battery modules, and a fan operation signal may be outputted so that the cooling fan 120 of the corresponding battery module operates.

On the other hand, if the module voltage deviation is less than a predetermined deviation reference value, it is determined that the voltage balance state between the corresponding battery module and the other battery modules is within a normal range, and a fan stop signal may be outputted so that the cooling fan 120 of the corresponding battery module does not operate.

To explain the principle, the cooling fan 120 according to the present invention is configured to use the voltage of the battery cells 110 included in the corresponding battery module as a driving power, which is not a separate external power source. Accordingly, if the voltage state of the corresponding battery module is higher than that of other battery modules, the cooling fan 120 is driven to discharge the battery cells 110 to lower a voltage of a higher state than other battery modules, thereby achieving voltage balancing with other battery modules.

Such an operation may be performed by the module voltage deviation comparison unit (not shown) of the third determination unit 1355 described above.

2.5. Cooling Fan Driving Power Application Step (S500)

The cooling fan driving power application step S500 is a step of applying the voltages of the battery cells 110 from the DC/DC converter 134 to the cooling fan 120 according to the control signal outputted in the cooling fan operation control step S400, and controlling the operation of the cooling fan 120.

Specifically, when a fan operation signal is outputted in the cooling fan operation control step S400, the DC/DC converter 134 may output a voltage applied from the battery cells 110 by adjusting the size thereof to enable the driving of the cooling fan 120. Accordingly, the cooling fan 120 receiving a voltage inputted through the DC/DC converter 134 is driven to perform a cooling operation on the corresponding battery module 100.

On the other hand, when the fan stop signal is outputted in the cooling fan operation control step S400, the DC/DC converter 134 may output the output voltage by lowering the level of the output voltage. Accordingly, the cooling fan 120 does not operate, so that the cooling operation for the corresponding battery module 100 is not performed (S600).

In this way, by considering the temperature and voltage state of each battery module and individually controlling the operation of the cooling fan accordingly, thermal management of battery cells included in each battery module may be performed more effectively. In addition, since the cooling fan is driven by the voltage of each battery module itself, not a separate external power source, the work of connecting each conventional cooling fan with a separate external power cable becomes unnecessary, so that this can eliminate the hassle and improve the ease and convenience for assembling the module.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A battery module in an energy storage system (ESS) including at least one battery rack with a plurality of battery modules, the battery module being one of the plurality of battery modules and comprising:
   a plurality of battery cells connected in one or more of: series and parallel;
   a cooling fan configured to operate using voltages of the battery cells as driving power; and
   a battery management system (BMS) configured to control turning the cooling fan on or off according to a module temperature and a module voltage of the battery module and according to a module temperature of an adjacent battery module adjacent to the battery module among the plurality of battery modules.

2. The battery module of claim 1, wherein the battery management system (BMS) comprises:
   a temperature measurement unit configured to measure the module temperature of the battery module at predetermined periodic intervals;
   a voltage measurement unit configured to measure the module voltage of the battery module at the predetermined periodic intervals;
   a communication unit configured to communicate with one or more other battery modules among the plurality of battery modules, the one or more other battery modules including the adjacent battery module;
   a DC/DC converter configured to:
     receive the voltages of the battery cells from the battery cells;
     convert the received voltages of the battery cells into a driving voltage for driving the cooling fan; and
     output the driving voltage; and
   a cooling fan control unit configured to turn the cooling fan on or off according to the module temperature and the module voltage of the battery module measured by the temperature measurement unit and the voltage measurement unit, respectively.

3. The battery module of claim 2, wherein the cooling fan control unit comprises:
- a module information transmission unit configured to transmit the module temperature and the module voltage of the battery module measured by the temperature measurement unit and the voltage measurement unit to the one or more other battery modules communicatively connected through the communication unit;
- a module information reception unit configured to receive module information from the one or more other battery modules communicatively connected through the communication unit;
- a first determination unit configured to:
  - compare the module temperature of the battery module measured by the temperature measurement unit with a first predetermined temperature reference value; and
  - control turning the cooling fan on or off according to the comparison of the module temperature of the battery module with the first predetermined temperature reference value;
- a second determination unit configured to:
  - compare the module temperature of the adjacent battery module with a second predetermined temperature reference value, the module information of the one or more other battery modules received by the module information reception unit including the module temperature of the adjacent battery module; and
  - control turning the cooling fan on or off according to the comparison of the module temperature of the adjacent battery module with the second predetermined temperature reference value; and
- a third determination unit configured to:
  - compare the module voltage of the battery module with a module voltage of the one or more other battery modules, the module information of the one or more other battery modules received by the module information reception unit including the module voltage of the one or more other battery modules; and
  - control turning the cooling fan on or off according to the comparison of the module voltage of the battery module with the module voltage of the one or more other battery modules.

4. The battery module of claim 3, wherein the first determination unit is further configured to:
- output a fan operation signal for operating the cooling fan when the module temperature of the battery module is equal to or higher than the first predetermined temperature reference value; and
- output a fan stop signal so that the cooling fan does not operate when the module temperature is less than the first predetermined temperature reference value.

5. The battery module of claim 4, wherein the DC/DC converter is further configured to:
- increase a voltage level of the driving voltage and output the increased driving voltage to drive the cooling fan when the fan operation signal is outputted; and
- lower the voltage level of the driving voltage so that the cooling fan is not driven and output the lowered driving voltage to the cooling fan when the fan stop signal is outputted.

6. The battery module of claim 3, wherein the second determination unit is further configured to:
- output a fan operation signal for operating the cooling fan when the module temperature of the adjacent battery module is higher than or equal to the second predetermined temperature reference value; and
- output a fan stop signal so that the cooling fan does not operate when the module temperature of the adjacent battery module is less than the second predetermined temperature reference value.

7. The battery module of claim 6, wherein the DC/DC converter is further configured to:
- increase a voltage level of the driving voltage and output the increased driving voltage to drive the cooling fan if the fan operation signal is outputted; and
- lower the voltage level of the driving voltage and output the lowered driving voltage so that the cooling fan is not driven if the fan stop signal is outputted.

8. The battery module claim 3, wherein the third determination unit comprises:
- a module voltage deviation calculation unit configured to calculate a difference between the module voltage measured by the voltage measurement unit and the module voltage of the one or more other battery modules included in module information of the one or more other battery modules received by the module information reception unit; and
- a module voltage deviation comparison unit configured to compare the difference with a predetermined deviation reference value.

9. The battery module of claim 8, wherein the module voltage deviation comparison unit is further configured to output a fan operation signal for operating the cooling fan if the difference exceeds the predetermined deviation reference value.

10. The battery module of claim 9, wherein the DC/DC converter is further configured to:
- a voltage level of the driving voltage and output the increased driving voltage to drive the cooling fan if the fan operation signal is outputted; and
- lower the voltage level of the driving voltage and output the lowered driving voltage so that the cooling fan is not driven if the fan stop signal is outputted.

11. The battery module of claim 1, wherein the BMS comprises a cooling fan controller configured to:
- receive module information from one or more other battery modules among the plurality of battery modules, the one or more other battery modules including the adjacent battery module, and the received module information including the module temperature of the adjacent battery module;
- control turning the cooling fan on or off based on a comparison of the module temperature of the battery module with a first predetermined temperature reference value; and
- control turning the cooling fan on or off based on a comparison of the module temperature of the adjacent battery module with a second predetermined temperature reference value.

* * * * *